June 2, 1964 E. T. J. TAPP ETAL 3,135,400
APPARATUS FOR COMPACTING MATERIAL FOR LOADING ON TO VEHICLES
Filed Nov. 14, 1960 7 Sheets-Sheet 1

INVENTORS
ERNEST THOMAS JAMES TAPP
DENSMORE WALKER
BY Irwin S. Thompson
ATTY.

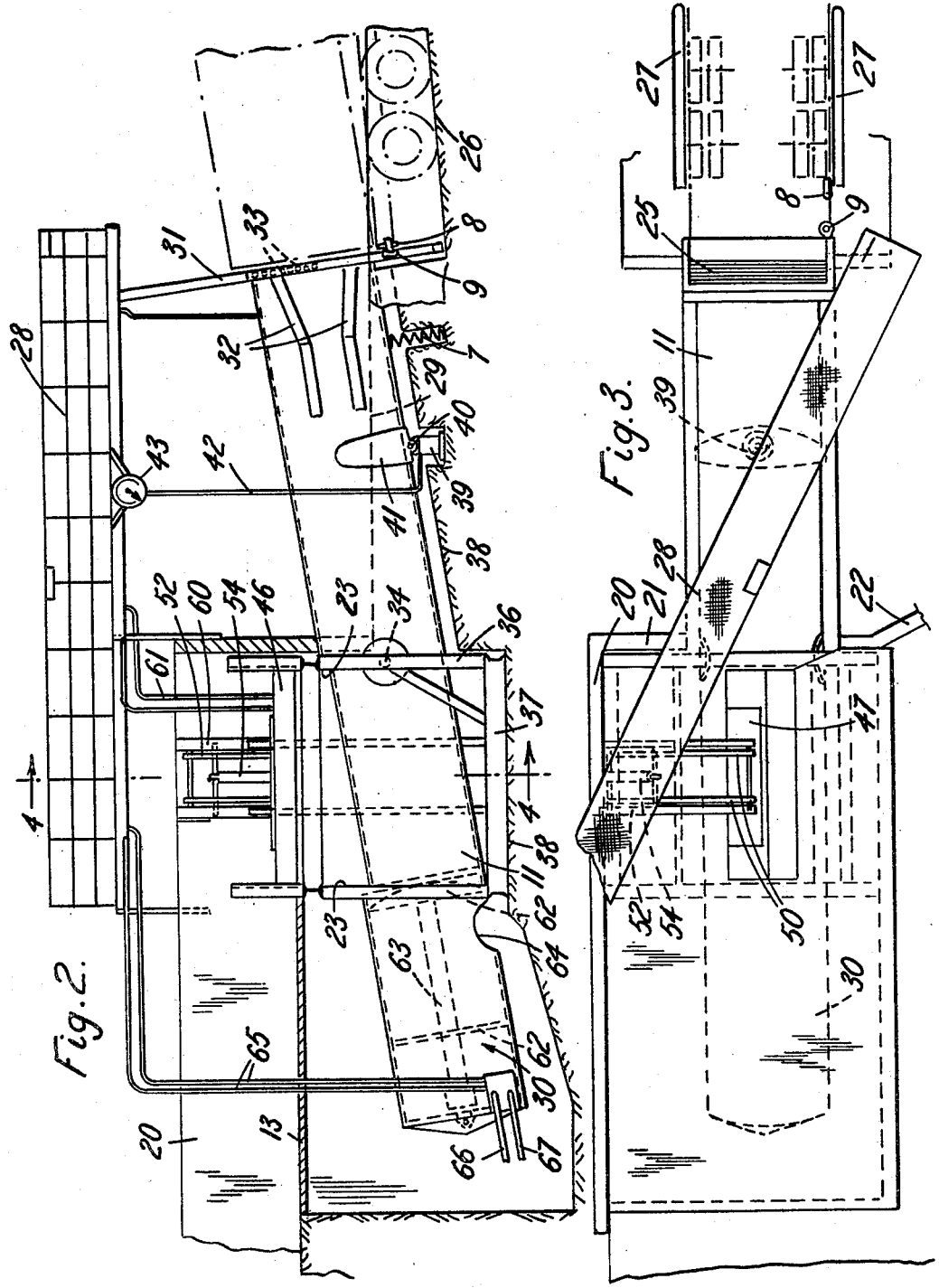

June 2, 1964 E. T. J. TAPP ETAL 3,135,400
APPARATUS FOR COMPACTING MATERIAL FOR LOADING ON TO VEHICLES
Filed Nov. 14, 1960 7 Sheets-Sheet 3
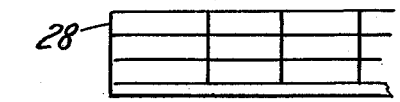
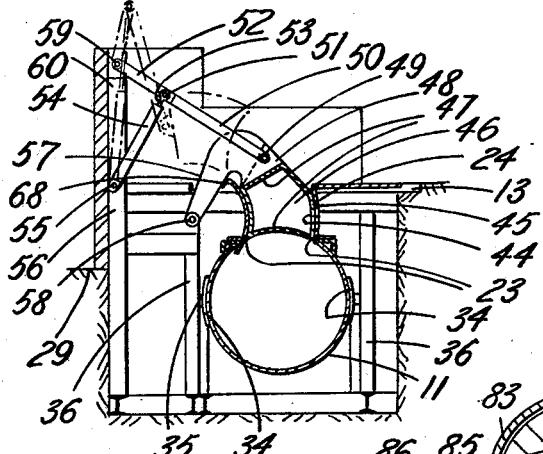
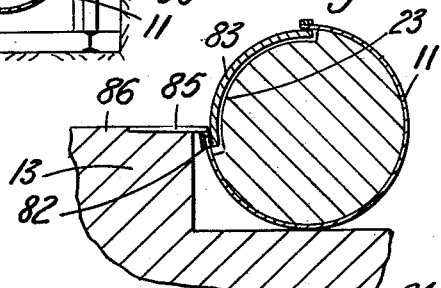
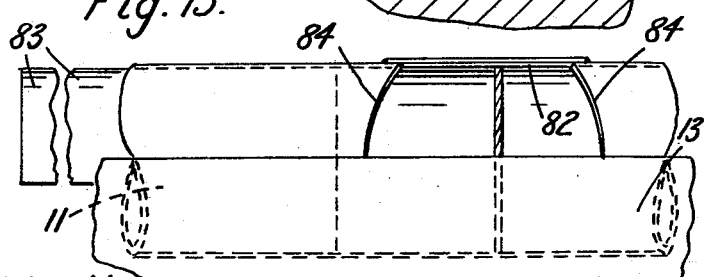
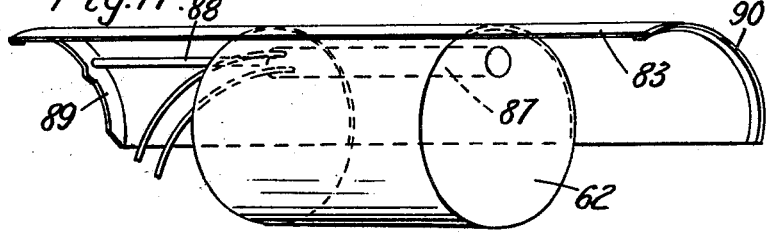
INVENTORS
ERNEST THOMAS JAMES TAPP
DENSMORE WALKER
BY Irwin S. Thompson
ATTY.

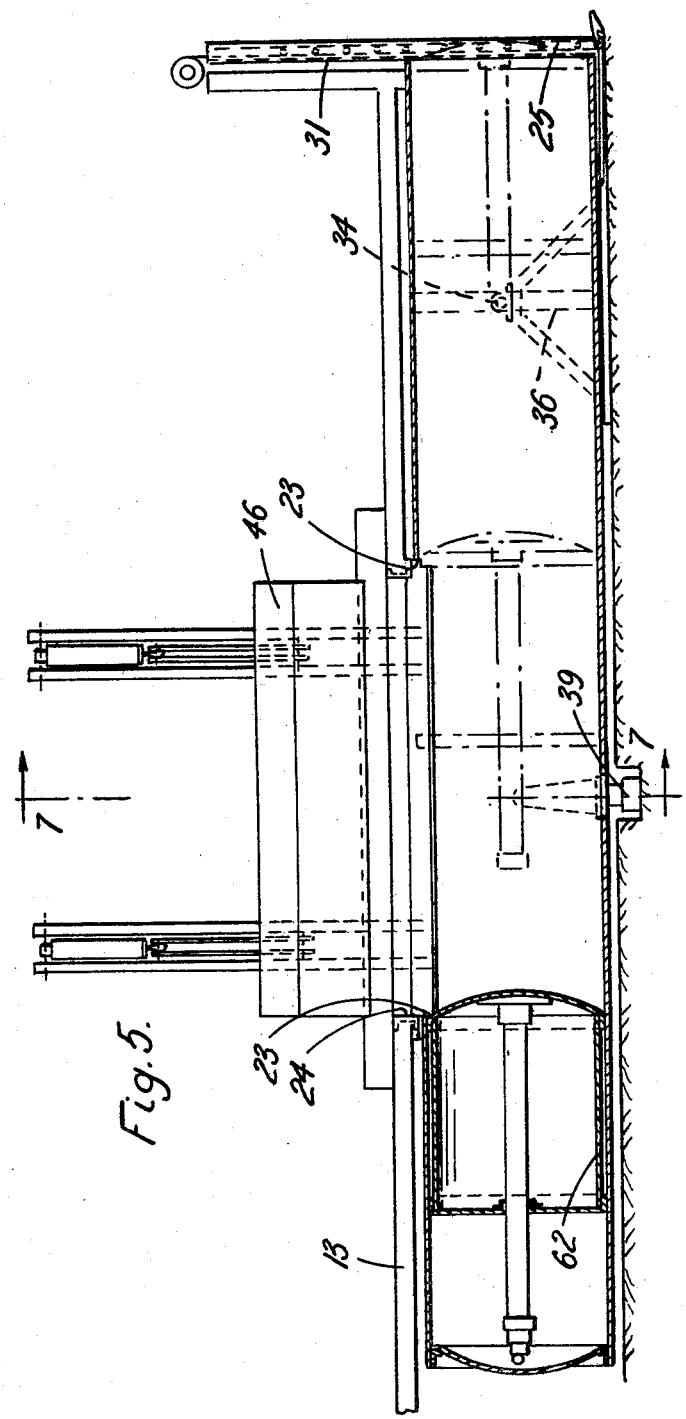

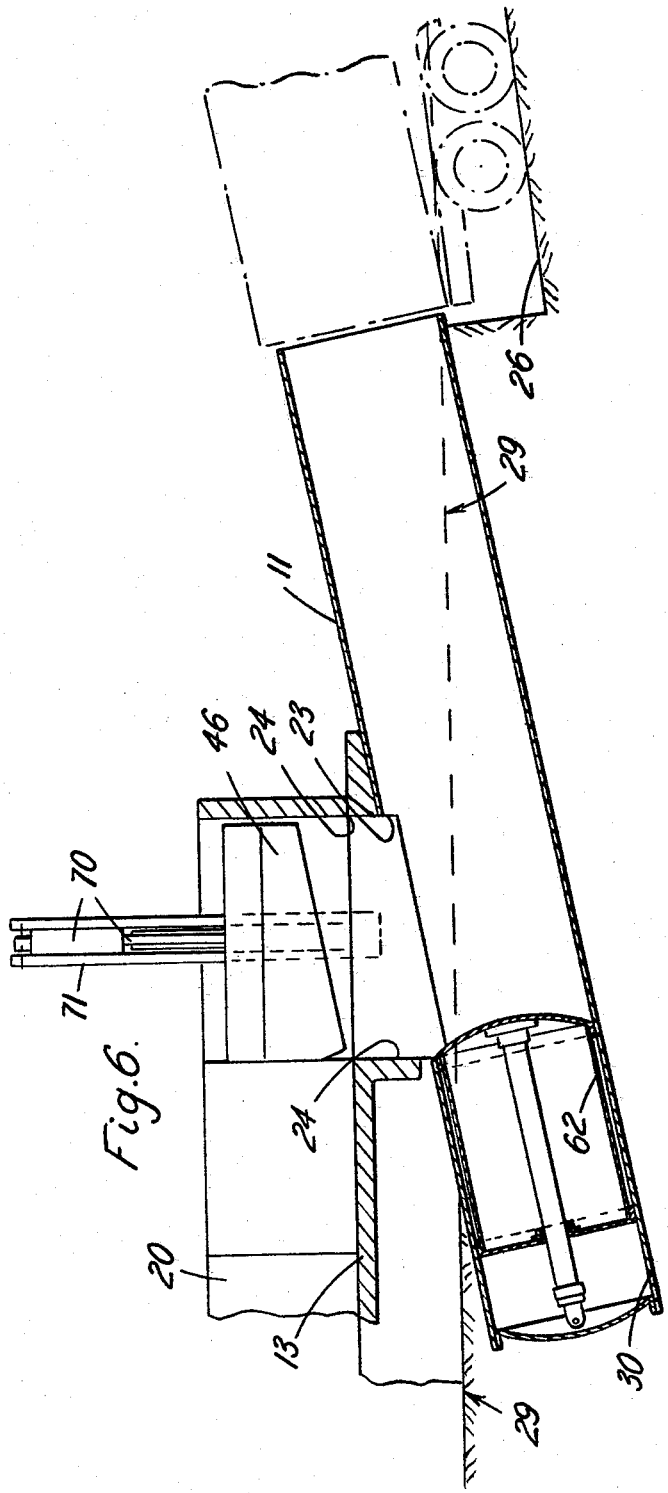

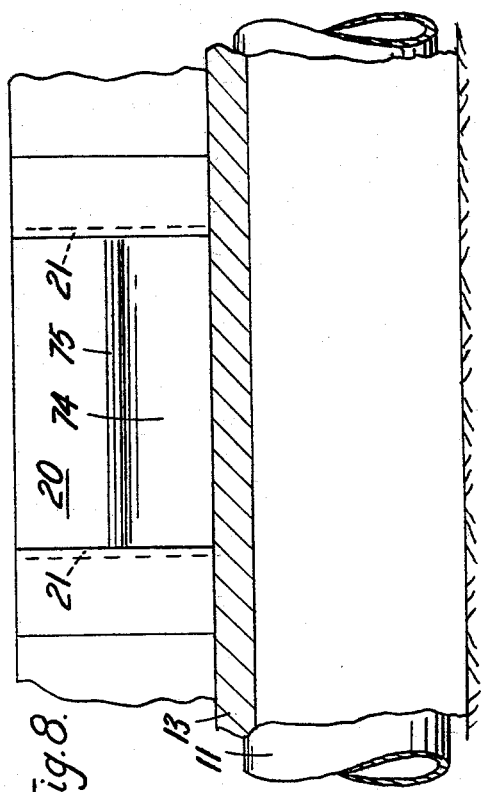
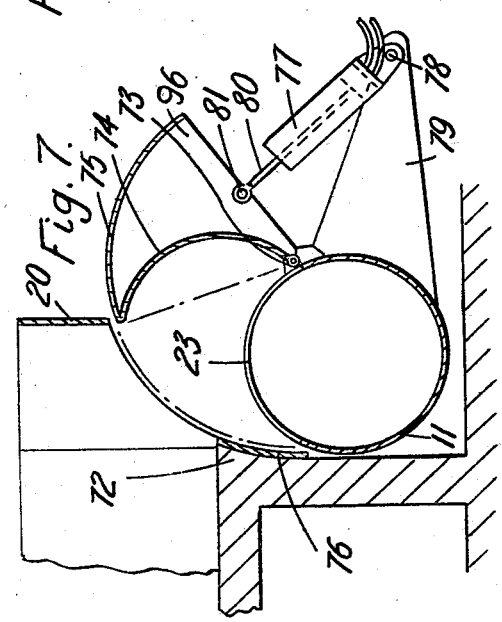

June 2, 1964   E. T. J. TAPP ETAL   3,135,400
APPARATUS FOR COMPACTING MATERIAL FOR LOADING ON TO VEHICLES
Filed Nov. 14, 1960                       7 Sheets-Sheet 7
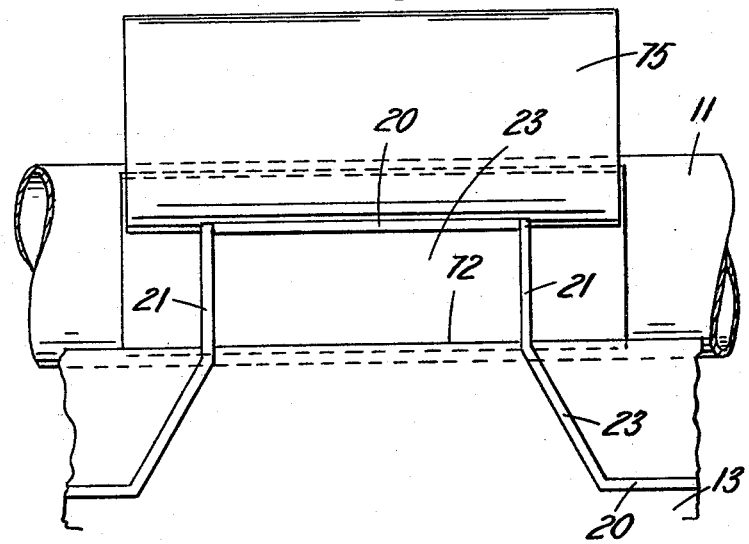
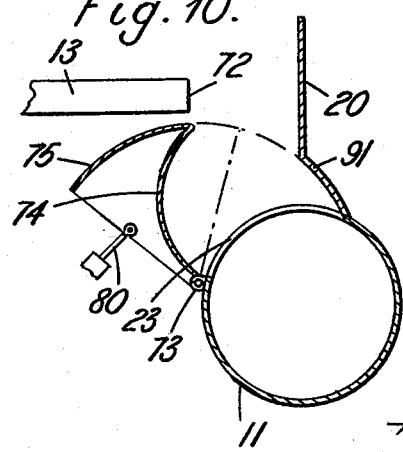
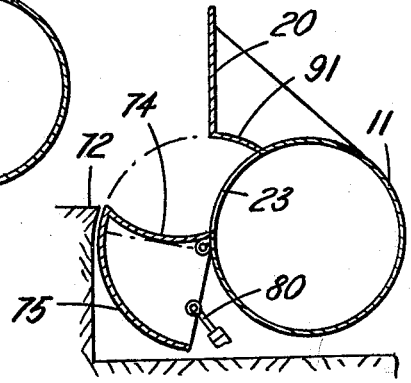
INVENTORS
ERNEST THOMAS JAMES TAPP
DENSMORE WALKER
BY Irwin S. Thompson
ATTY.

United States Patent Office 3,135,400
Patented June 2, 1964

3,135,400
APPARATUS FOR COMPACTING MATERIAL FOR LOADING ON TO VEHICLES
Ernest Thomas James Tapp and Densmore Walker, Aldershot, England, assignors to Walkers and County Cars Limited, Aldershot, England, a British company
Filed Nov. 14, 1960, Ser. No. 69,103
Claims priority, application Great Britain Nov. 17, 1959
8 Claims. (Cl. 214—41)

This invention relates to apparatus of the kind for compacting loose material for loading on to bulk transport vehicles which material includes household refuse.

According to this invention an apparatus of the kind referred to comprises a compression chamber having a charging opening in the upper part thereof and a movable closure wall at one end, a compression member movable along the compression chamber from one side to the other of said opening so as to compress, against the closure wall, material previously introduced through said charging opening and eject it upon removal of the closure wall, a fixed loading platform having a sill or an opening over which the material to be compressed may be showered into the compression chamber.

In the case where the loading platform and compression chamber are provided with openings in register with the opening in the platform, after a charge has been introduced into the compression chamber, may be closed by a closure member pivotally mounted on a fixed structure so that the closure member forces the material into a chamber and the inner face of the closure member is so shaped that the compression member may sweep across it.

In the case where the platform is provided with a sill opposite the opening in the compression chamber a closure member may be movably mounted directly on the compression chamber.

In an alternative arrangement a shutter may be mounted so that it may be movable along the compression chamber after a charge has been introduced so as to close the opening while the compression member is moving across it.

Power means may be provided for moving the closure member or shutter.

In any of the arrangements referred to above the material to be compacted may be introduced into the compression chamber through said openings or over said sill by a vehicle equipped to push or bull-doze the material along the loading platform, and the platform may be provided at its edge adjacent the opening with an upstanding wall extending transversely to the direction in which the material is being pushed so as to prevent it from being moved beyond the opening.

There may be provided means for weighing the compression chamber and its contents. For example, the compression chamber and the associated parts may be mounted to rock about trunnions and the compression chamber may be supported by weighing apparatus to one side of the rocking axis.

In a preferred arrangement the rocking axis is so disposed along the length of the compression chamber that when the latter is empty and the compression member therein is in the position it assumes when a full load is compressed the chamber is at one limit of its swinging movement either due to the centre of gravity being disposed away from the rocking axis or due to the provision of a spring constituting a part of the weighing apparatus. Thus as soon as a full load has been compacted the compression chamber will overbalance or move against the action of the spring and in so doing, it may actuate a warning device.

At least that end of the compression chamber remote from the discharge end may be sunk or partly sunk below the ground so that the height of the loading platform may be as small as possible.

The compression chamber may be arranged so that its longitudinal axis is inclined to the general level of the ground so that its discharge end is higher than the other end and the ground may be formed with a downwardly extending ramp with its lower end below ground level the inclination of which is such that when a bulk transport vehicle moves down the ramp its rear end is in the position to receive the compacted material from the compression chamber.

A number of compression chambers may be arranged side by side in parallel relationship having their charging openings below openings in the platform or opposite sills on the platform which chambers are arranged in echelon. The aforesaid loading platform and ramps may be arranged in a yard into which the collecting vehicles and bulk transport vehicles can enter, and there is provided a ramp leading up to the loading platform for the collecting vehicles and another one at the end of the platform on which the collecting vehicles descend after having discharged their loads.

Preferably one part of a connection is provided on each compression chamber or its supporting structure for engagement with another part of the connection on a bulk transport vehicle so as to prevent the latter from being forced away from the loading platform when the compacted charge is introduced into a container on the vehicle.

An elevated cat way may be arranged to extend above the loading platform so that parts of the cat way are disposed close to the charging and discharging openings enabling one operator to control a number of the compression chambers.

The following is a description of a number of embodiments of the invention reference being made to the accompanying drawings in which:

FIGURE 2 is a part side elevation and part vertical section showing the loading platform, compression chamber and ramp for the bulk transport vehicles;

FIGURE 3 is a plan view of a part of the loading station in more detail than is shown in FIGURE 1;

FIGURE 4 is a section on the line 4—4 of FIGURE 2;

FIGURE 5 is a similar view to FIGURE 2 of an alternative form of arrangement embodying a horizontally disposed compression chamber;

FIGURE 6 is a similar view to FIGURE 5 of a further alternative arrangement embodying a rectilinearly reciprocable closure plug;

FIGURE 7 is a diagrammatic section through a compression chamber having a hinged closure member;

FIGURE 8 is a side elevation of the arrangement shown in FIGURE 7;

FIGURE 9 is a plan of the arrangement shown in FIGURE 8;

FIGURE 10 is a similar view to FIGURE 7 of an arrangement in which the hinged closure member is arranged on the opposite side of the loading opening;

FIGURE 11 is a similar view to FIGURE 10 of an arrangement in which the compression chamber is disposed further away laterally from the loading platform;

FIGURE 12 is a diagrammatic cross-section through a compression chamber in which the loading opening is closed by a sliding shutter;

FIGURE 13 is a side elevation of the arrangement shown in FIGURE 12 looking from the right of FIGURE 12; and FIGURE 14 is a diagrammatic perspective view of a mechanism for applying movement to the shutter shown in FIGURE 13.

Figure 1:
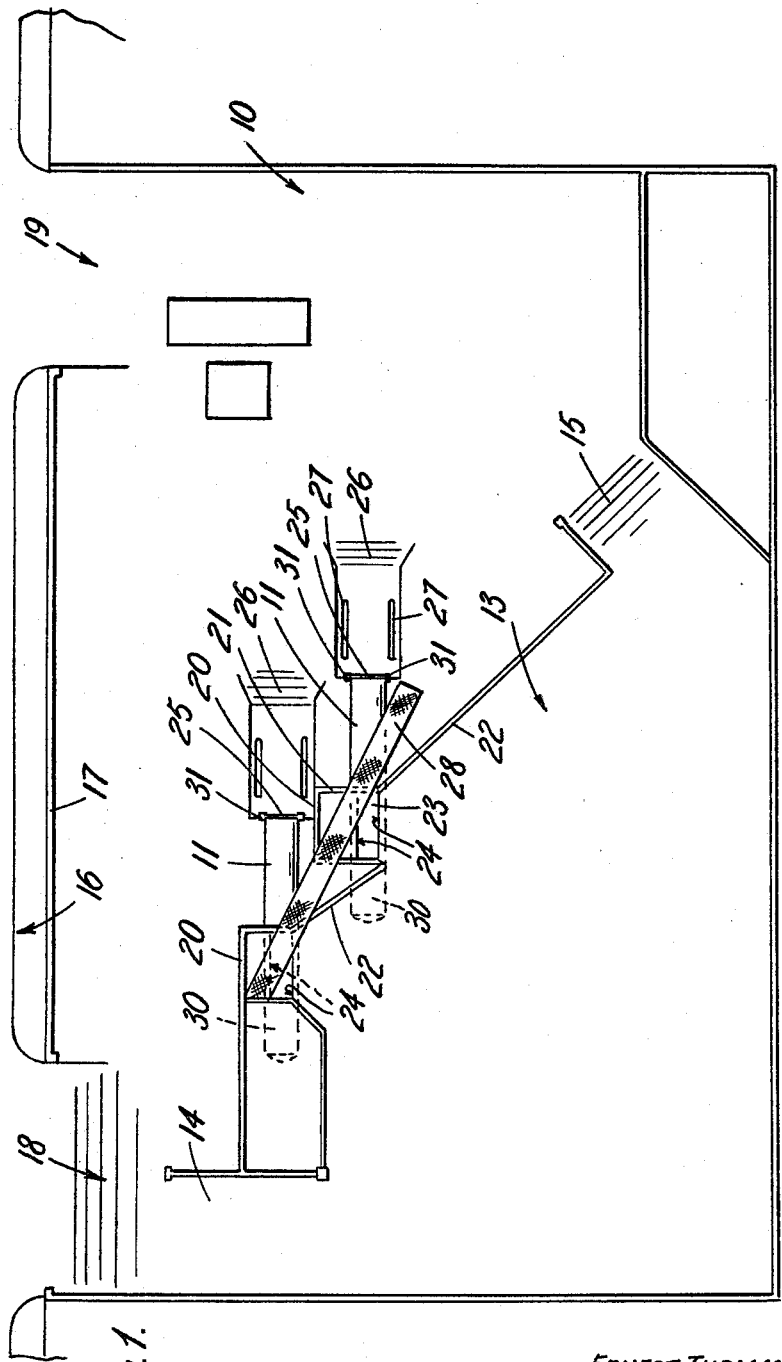
FIGURE 1 is a diagrammatic plan view of a loading station.

Referring to FIGURE 1 there is arranged within a walled yard 10 two compression chambers 11 arranged side by side in parallel relationship and in echelon. More than two compression chambers may be provided if required. A part of each compression chamber indicated at 12 is disposed beneath an elevated loading platform 13. Ramps 14 and 15 extend between the elevated platform and the ground level of the yard. Collection vehicles containing the material to be compressed may run up the ramp 14 on to the platform and down the other 15 after discharging their material on to the loading platform. The yard may be arranged to one side of a roadway 16 and separated therefrom by a wall 17 having openings 18 and 19 through which the vehicles may enter and leave.

The edge of the elevated platform may be of a zig-zag character having edges 20 which are parallel with the axes of the compression chambers and other edges 21 at right angles thereto and inclined edges 22 all of which are provided with retaining walls which project above the platform.

The upper part of each compression chamber 13 is provided with a loading opening 23 which is arranged in register with a similar shaped opening 24 in the loading platform with which opening there is associated a closure member referred to later. Each compression chamber 11 is provided at that end which projects into the yard with a vertically sliding closure wall 25.

Each compression chamber is also provided with a piston referred to later which can move from one side to the other of the loading opening 23 so that after the loose material has been introduced into the opening it can be compressed against the closure wall 25.

A downward ramp 26 is formed in the yard opposite the discharge end of each compression chamber onto which ramp the bulk transport vehicles may be backed, and the heights of the discharge ends of the compression chambers above the bottoms of the ramps are such that they may be brought into register with the openings at the rear ends of the containers on the bulk transport vehicles.

Roller guides 27 are provided at the sides of the ramp which so guide the bulk transport vehicles that the aforesaid registration may be effected after the closure wall 25 has been slid upwardly, whereupon the compressed material can be ejected from the compression chamber into the container on the transport vehicle.

In order to assist in moving the loose material which has been dumped by the collecting vessels on the platform into the openings 23, 24 there may be provided on the elevated platform a vehicle equipped to push the material into the openings, the upstanding wall on the platform preventing it from being pushed across the opening. The platform is provided with an elevated cat walk 28 arranged at such an angle that an operator can by walking along it attend to the vertically sliding closure walls 25 and the opening and closing means for the loading openings in the compression chambers and inspect progress in general.

Referring now to FIGURES 2 to 4 it will be seen that the compression chambers 11 are inclined to the ground level and so sunk that only the discharge end is completely above ground level whereas an extension 30 of the compression chamber remote from the discharge end is completely below ground level. The closure wall 25 of each compression chamber is mounted between two upwardly extending slideways 31 which are secured to the walls of the compression chamber by a supporting structure 32. The slideways 31 are provided with eyes 9 which are engageable by swinging pins 8 on the bulk transport vehicles 7 so as to prevent the vehicles from being pushed away by the action of loading them.

Anti-friction rollers 33 may be associated with the slideways and the closure wall 25. Up and down movement of the closure wall may be effected by hydraulic rams (not shown) which can be controlled from the cat walk 28.

As best seen in FIGURE 4 each compression chamber 11 is provided with trunnions 34 mounted in bearings 35 fixed to uprights 36 of a supporting structure. The base 37 of the supporting structure rests on foundations of concrete 28 in an excavation in the ground.

As will be seen from FIGURE 2 the trunnion axis is disposed almost immediately below that end of the opening 23 in the compression chamber nearer the discharge end thereof.

Mounted intermediate of the forward end of the opening 23 and the discharge end of the compression chamber is a weighing mechanism 39 a movable element 40 of which engages a plate 41 on the underside of the compression chamber. A transmission 42 extends from the weighing mechanism to an indicator 43 which can be viewed from the cat walk 28.

By these means the amount of material introduced into the compression chamber can be measured and it can be ascertained when the bulk transport vehicle has received a safe load.

It will be appreciated that trunnions may be disposed in different positions along the compression chamber, for example, they may be disposed away from the opening 23 on that side thereof remote from the discharge end of the compression chamber, the weighing apparatus may be disposed on the underside of the compression chamber beneath the charging opening, or on the opposite side of the charging opening to where trunnions are disposed. When the weighing apparatus is not in use clamping means may be provided on the supporting structure for holding the compression chamber against movement.

In a preferred arrangement the trunnions are so disposed along the length of the compression chamber 11 and its extension 30 that when the chamber is empty and the piston is in a position it assumes when a full load has been compressed the chamber is at one limit of its swing about the axis of the trunnions either by reason of out of balance conditions or by reason of a spring 7 acting upon it as shown in FIGURE 2. The arrangement being such that when a full compacted load in the chamber is approached the chamber will swing towards the opposite limit of its movement and in so doing will first operate switch mechanism in circuit with a warning device and then switch mechanism in circuit with a full load indicator.

Extending upwardly from the compression chamber around the opening 23 is a conduit 44 which projects into or telescopes with another conduit 45 lining the opening 24 in the platform 13.

The conduit 44 is rectangular in cross-section and curved along its length. Insertable in the conduit 44 is a hollow closure plug 46 the inner face of which is curved so that when the closure plug is in position the curved face forms a continuation of the cylindrical compression chamber 11. The outer wall 47 of the closure plug is formed with ears 48 to which is pivotally connected at 49 one end of a link 50. The other end of the link is pivotally connected at 51 to one end of a further link 52 and to a plunger 53 of a double acting hydraulic ram cylinder 54. The lower end of the ram cylinder is pivotally connected at 55 to an upright 56 of the aforesaid supporting structure. The outer wall 47 of the hollow plug has also attached to it an arm 57 which is pivoted at 58 to a member of the aforesaid supporting structure.

The aforesaid curved conduit 44 has its centre of curvature on the pivot axis 58.

The other end of the link 52 is pivotally connected at 59 to an upright 60 on the aforesaid supporting structure. It will be appreciated with this arrangement that the hydraulic ram has the maximum mechanical advantage on the hollow closure plug 46 when that plug is in the closed position. Thus should the hollow plug become jammed in forcing the material into the cylinder upon the return stroke it is readily freed by the hydraulic ram.

The control conduits 61 for the ram 54 extend up to controls (not shown) on the cat walk 28. The piston is formed by two discs 62 fixed to a moving element 63 of a hydraulic ram which piston reciprocates in the compression chamber so as to be movable from one side to the other of the opening 23 therein. The hydraulic ram is disposed within the extension 30 of the compression chamber. The piston may be provided with a waist or may be dumb-bell shaped (not shown). The extension 30 of the compression chamber may be provided with an opening 64 so should any material pass rearwardly from the front face of the piston and jam it the material can be removed through the opening 64 when the piston is retracted.

The control conduit 65 of this latter ram may also extend up to the cat walk where a control for it is readily available. The feed and return pipes 66, 67 for the ram extend out through the end wall of the extension 30.

The gap between the closure plug in its open position and the upper surface of the loading platform 13 may be closed by upstanding ribs 68 on said platform.

The inner face of the closure plug which extends in an inclined manner over the opening 24 assists in the material being introduced into the conduit 44 leading to the interior of the compression chamber.

In the arrangement shown in FIGURE 5 the compression chamber is horizontally disposed instead of being inclined to the horizontal and the weighing cell 39 is arranged to bear on the underside of the compression chamber immediately below the centre of the charging opening 23, whereas the trunnions 34 are disposed intermediate of the forward end of the opening 23 and the closure wall 25. Otherwise the general arrangement of the hollow closure plug 46 and the piston 62 is similar to the arrangement previously desribed.

The arrangement shown diagrammataically in FIGURE 6 is similar to that described with reference to FIGURES 1 to 4, in this instance, however, simple reciprocable movement is imparted to the closure plug 46 by a double acting ram 70 mounted on a super structure 71 fixed to the platform 13.

In the arrangement shown in FIGURES 7 to 9 the compression chamber 11 is disposed to one side of a sill 72 formed along a side of the loading platform 13 and there is hinged at 73 along that edge of the loading opening 23 of the compression chamber remote from the sill a closure member 74 to which is secured a shroud 75 on the outside thereof. Web portions 96 may be provided between the closure member 74 and its shroud 75. The closure member 74 may be swung from the covering position to an open position by means of a hydraulic ram the cylinder 77 of which is pivoted at 78 to a bracket 79 fixed to the compression chamber and the piston rod 80 of which is pivoted at 81 to the edge of one of the aforesaid webs 96.

As will be seen from FIGURE 9 walls 21, upstanding from the edge of the loading platform 13, project outwardly beyond the sill 72 their outer ends terminating in the wall 20.

The width between the two walls 21 is less than the width of the loading opening 23 in the compression chamber so that the material is less likely to jam in the opening during loading.

The lower edge of the wall 20 is disposed at a higher level than the top of the loading platform 13 and the gap between it and the ledge is closed by the shroud 75 when the closure member 74 has closed the opening.

The curved face of the sill 72 may be lined with wear-resisting material 76.

In the arrangement shown in FIGURE 10 the compression chamber 11 is arranged at a lower level with respect to the loading platform 13 than that shown in FIGURE 7 and the curved closure member 74 is pivoted at 73 along the edge of the opening 23 near the sill 72 of the platform.

The wall 20 extends below the level of the opening platform and is provided with a curved extension 91 which meets one edge of the opening 23. When the closure member 74 is in the covering position the shroud 75 is in the opening between the sill 72 and the wall 20.

In the construction shown in FIGURE 11 the compression chamber 11 is shown at a considerable distance laterally from the sill 72 and the gap between these parts is closed by the closure member 74 when in an open position, and in this instance the closure member 74 is pivoted along that edge of the opening 23 which is nearer the sill.

As in the construction shown in FIGURES 7 to 9 a hydraulic ram (not shown) is employed for imparting opening and closing movement to the closure member 74 in the constructions shown in FIGURES 10 and 11.

In the arrangement shown in FIGURES 12 and 13 the compression chamber 11 has a loading opening 23 which extends from the highest point in the compression chamber 11 down one side of the chamber to a position slightly below the centre thereof.

The compression chamber is strengthened by a plate 82 in the neighborhood of the opening 23. A shutter 83 is fixed and trails from the piston with respect to the compressing movement.

The lower edge of the opening 23 is arranged to be longer than the upper edge so that the opening has inclined side edges 84 somewhat in the manner of a trapezium.

The compression chamber is disposed to one side of a false sill-plate 85 countersunk in the upper face of the loading platform 13. The shutter when in an open position lies within the compression chamber 11.

In an alternative arrangement shown in FIGURE 14 the shutter 83 is movable relatively to the piston and is of such a length that it may extend on either side of the piston 62. Movement may be imparted to the shutter relatively to the piston by a hydraulic ram the end of the cylinder 87 of which is fixed to a part of the piston and the plunger 88 of which ram is secured to a flange 89 at one end of the shutter. The leading end of the shutter with respect to the direction of compressing the material is formed with a cutting edge 90. With this arrangement after a load has been introduced into the loading opening 23 in the compression chamber the piston is moved forwardly with the cutting edge disposed forwardly thereof but the greater part of the shutter will be on the trailing side of the piston. When the cutting edge has passed beyond the opening 23 the hydraulic ram 87 comes into operation so that whereas the piston 62 continues to move the shutter 83 remains over the opening 23.

We claim:

1. Equipment for loading and transporting refuse comprising a transport having a container for the refuse provided with a charging opening, a loading device separate from said transport, an elongated compression chamber fixed in relation to the loading device and having a cross-sectional shape similar to that of the container but of smaller area and having a charging opening in the upper part thereof disposed below the loading device and a discharge opening at an end thereof, a compression member reciprocable in said compression chamber from one side of said charging opening to the other, a removable closure member associated with said discharge opening against which closure member the refuse can be compressed by the compression member, guide means for registering the charging opening of the container with the discharge opening at the end of said compression chamber, connecting means for maintaining said registration, means for moving said closure member into and out of said discharge opening, means for imparting reciprocating movement to said compression member whereby a compressed charge of refuse can be ejected from said compression chamber in the same direction in which it was compressed, into the container, said guide means for registering the charging opening of the container and the discharge opening at the end of the compression chamber comprising a supporting surface for the wheels of the transport adjacent said loading device and said end of the compression chamber adapted to locate the said charging opening of said transport at the same height as the height of the discharge opening of the compression chamber, and guide rollers flanking said supporting surfaces adapted to guide the transport to bring said openings into register.

2. Equipment for loading and transporting refuse comprising a transport having a container for the refuse provided with a charging opening, a loading device separate from said transport, an elongated compression chamber fixed in relation to the loading device and having a cross-sectional shape similar to that of the container but of smaller area and having a charging opening in the upper part thereof disposed below the loading device and a discharge opening at an end thereof, a compression member reciprocable in said compression chamber from one side of said charging opening to the other, a removable closure member associated with said discharge opening against which closure member the refuse can be compressed by the compression member, guide means for registering the charging opening of the container with the discharge opening at the end of said compression chamber, connecting means for maintaining said registration, means for moving said closure member into and out of said discharge opening, means for imparting reciprocating movement to said compression member whereby a compressed charge of refuse can be ejected from said compression chamber in the same direction in which it was compressed into the container, the loading device including a loading platform disposed contiguous to said compression chamber, said loading platform having a supporting surface for receiving the refuse with an opening therein opposite said charging opening in said compression chamber, means for closing said charging opening in said compression chamber at least while said compression member is sweeping thereacross, the closing means for said charging opening in said compression chamber comprising a shutter, and means for moving the shutter to close the charging opening as said compression member moves past it.

3. Equipment according to claim 2 wherein said shutter and compression member are provided with a shearing edge projecting from the leading side and adapted to cut through any material projecting into said charging opening during the compression stroke.

4. Equipment for loading and transporting refuse comprising a transport having a container for the refuse provided with a charging opening, a loading device separate from said transport, an elongated compression chamber fixed in relation to the loading device and having a cross-sectional shape similar to that of the container but of smaller area and having a charging opening in the upper part thereof disposed below the loading device and a discharge opening at an end thereof, a compression member reciprocable in said compression chamber from one side of said charging opening to the other, a removable closure member associated with said discharge opening against which closure member the refuse can be compressed by the compression member, guide means for registering the charging opening of the container with the discharge opening at the end of said compression chamber, connecting means for maintaining said registration, means for moving said closure member into and out of said discharge opening, means for imparting reciprocating movement to said compression member whereby a compressed charge of refuse can be ejected from said compression chamber in the same direction in which it was compressed into the container, the loading device including a loading platform provided with an opening registering with the charging opening in the compression chamber, a movable closure means associated with the opening in the loading platform which can be introduced into or withdrawn from this opening and when in said platform opening forms a closure which is so shaped that the compression member sweeps thereacross, toggle linkage means disposed between said loading platform and said closure means, ram means operatively connected to said linkage means to actuate same so that when said linkage means is straightened out the closure means moves towards the closed position, the closure means being arranged to have a swinging movement, and means for limiting the extent of swing of the closure means so that at its fully open position its inner face is inclined so as to direct the material into the charging opening of the compression chamber.

5. Equipment for loading and transporting refuse comprising a transport having a container for the refuse provided with a charging opening, a loading device separate from said transport, an elongated compression chamber fixed in relation to the loading device and having a cross-sectional shape similar to that of the container but of smaller area and having a charging opening in the upper part thereof disposed below the loading device and a discharge opening at an end thereof, a compression member reciprocable in said compression chamber from one side of said charging opening to the other, a removable closure member associated with said discharge opening against which closure member the refuse can be compressed by the compression member, guide means for registering the charging opening of the container with the discharge opening at the end of said compression chamber, connecting means for maintaining said registration, means for moving said closure member into and out of said discharge opening, and means for imparting reciprocating movement to said compression member whereby a compressed charge of refuse can be ejected from said compression chamber in the same direction in which it was compressed into the container, a number of said compression chambers and associated compression members being arranged side by side below said loading device which has openings registering with the charging openings in the upper parts of the compression chambers so that while compaction of the material is being carried out in one compression chamber the previously compacted load in another of the compression chambers can be ejected into the transport container, said compression chambers being arranged in parallel with one another in echelon as are also the openings in the loading device.

6. Equipment according to claim 5 wherein downwardly inclined ramps are provided adjacent the discharge openings of respective compression chambers for the transport, said ramps also being disposed in parallel relationship with one another.

7. Equipment for loading and transporting refuse comprising a transport having a container for the refuse provided with a charging opening, a loading device separate from said transport, an elongated compression chamber fixed in relation to the loading device and having a cross-sectional shape similar to that of the container but of smaller area and having a charging opening in the upper part thereof disposed below the loading device and a discharge opening at an end thereof, a compression member reciprocable in said compression chamber from one side of said charging opening to the other, a removable closure member associated with said discharge opening against which closure member the refuse can be compressed by the compression member, guide means for registering the charging opening of the container with the discharge opening at the end of said compression chamber, connecting means for maintaining said registration, means for moving said closure member into and out of said discharge opening, and means for imparting reciprocating movement to said compression member whereby a compressed charge of refuse can be ejected from said compression chamber in the same direction in which it was compressed into the container, the compression member being in the form of a piston and there being an opening in the underside of an extension of the compression chamber, on that side of the charging opening remote from the discharge end of the chamber to remove any material passed rearwardly from the front face of the piston during compression thereof when the piston is retracted.

8. Equipment for loading and transporting refuse comprising a transport having a container for the refuse provided with a charging opening, a loading device separate from said transport, an elongated compression chamber fixed in relation to the loading device and having a cross-sectional shape similar to that of the container but of smaller area and having a charging opening in the upper part thereof disposed below the loading device and a discharge opening at an end thereof, a compression member reciprocable in said compression chamber from one side of said charging opening to the other, a removable closure member associated with said discharge opening against which closure member the refuse can be compressed by the compression member, guide means for registering the charging opening of the container with the discharge opening at the end of said compression chamber, connecting means for maintaining said registration, means for moving said closure member into and out of said discharge opening, and means for imparting reciprocating movement to said compression member whereby a compressed charge of refuse can be ejected from said compression chamber in the same direction in which it was compressed into the container, said compression chamber having an elongated configuration and being disposed substantially horizontally and said charging opening extending downwardly from the top of said compression chamber on one side thereof and the loading device including a loading platform provided with an opening registering with the charging opening in said compression chamber, a supporting surface for receiving the refuse, and a sill along one side of said supporting surface opposite said charging opening in said compression chamber.

References Cited in the file of this patent

UNITED STATES PATENTS

| | | |
|---|---|---|
| 95,707 | McGillivrae et al. | Oct. 12, 1869 |
| 234,983 | Hoefjen | Nov. 30, 1880 |
| 566,976 | Forder | Sept. 1, 1896 |
| 1,549,387 | Schmithals | Aug. 11, 1925 |
| 1,622,669 | Price | Mar. 29, 1927 |
| 2,604,035 | Shipley | July 22, 1952 |
| 2,847,808 | Romine | Aug. 19, 1958 |
| 3,013,675 | Schonrock | Dec. 19, 1961 |

FOREIGN PATENTS

| | | |
|---|---|---|
| 201,976 | Austria | Feb. 10, 1959 |